(12) United States Patent
Cernohous et al.

(10) Patent No.: US 11,254,796 B2
(45) Date of Patent: Feb. 22, 2022

(54) SACRIFICIAL MICROSPHERES

(71) Applicant: Interfacial Consultants LLC, Prescott, WI (US)

(72) Inventors: Jeffrey J. Cernohous, Hudson, WI (US); Paul E. Humpal, Stillwater, MN (US); Nathan Ockwig, Eagan, MN (US)

(73) Assignee: Interfacial Consultants LLC, Prescott, WI (US)

( * ) Notice: Subject to any disclaimer, the term of this patent is extended or adjusted under 35 U.S.C. 154(b) by 125 days.

(21) Appl. No.: 16/343,067

(22) PCT Filed: Oct. 19, 2017

(86) PCT No.: PCT/US2017/057381
§ 371 (c)(1),
(2) Date: Apr. 18, 2019

(87) PCT Pub. No.: WO2018/075765
PCT Pub. Date: Apr. 26, 2018

(65) Prior Publication Data
US 2019/0284359 A1    Sep. 19, 2019

Related U.S. Application Data

(60) Provisional application No. 62/409,997, filed on Oct. 19, 2016.

(51) Int. Cl.
| | | |
|---|---|---|
| *C08J 9/00* | (2006.01) | |
| *B01J 13/22* | (2006.01) | |
| *C08J 9/32* | (2006.01) | |
| *B01J 13/20* | (2006.01) | |
| *B01J 13/14* | (2006.01) | |

(52) U.S. Cl.
CPC ............. *C08J 9/009* (2013.01); *B01J 13/14* (2013.01); *B01J 13/206* (2013.01); *B01J 13/22* (2013.01); *C08J 9/32* (2013.01); *C08J 2201/03* (2013.01); *C08J 2323/00* (2013.01); *C08J 2323/06* (2013.01); *C08J 2323/08* (2013.01); *C08J 2323/12* (2013.01)

(58) Field of Classification Search
CPC . B01J 13/14; B01J 13/206; B01J 13/22; C08J 9/009; C08J 9/32
See application file for complete search history.

(56) References Cited

U.S. PATENT DOCUMENTS

| 4,582,756 A | 4/1986 | Niinuma et al. |
|---|---|---|
| 2007/0155859 A1 | 7/2007 | Song et al. |
| 2012/0237606 A1 | 9/2012 | Wellings |
| 2016/0083619 A1 | 3/2016 | Anderson et al. |

FOREIGN PATENT DOCUMENTS

| JP | H 03-079644 A | 4/1989 |
|---|---|---|
| JP | S 60-019033 A | 1/1991 |
| JP | H 04-295030 A | 10/1992 |
| JP | H 04-295031 A | 10/1992 |
| JP | H 05-139783 A | 6/1993 |
| JP | H 06-254380 A | 9/1994 |
| JP | 2007-031706 A | 2/2007 |
| JP | 2013-234255 A | 11/2013 |
| JP | 2014-513185 A | 5/2014 |
| JP | 2016-503100 A | 2/2016 |
| KR | 20140027347 A | 3/2014 |
| WO | WO 2012-151178 A2 | 11/2012 |

OTHER PUBLICATIONS

Database WPI, Week 200725, Feb. 8, 2007 (Feb. 8, 2007), Thomson Scientific, Londong, GB; AN 2007-246547, XP002777006.
Database WPI, Week 201378, Nov. 21, 2013 (Nov. 21, 2013), Thomson Scientific, London, GB; AN2013-V09031, XP002777007.
Liu Li et al., "Synergistic flame retardant effects between hollow glass microspheres and magnesium hydroxide in ethylene-vinyl acetate composites," Polymer Degradation and Stability, vol. 104, Apr. 1, 2014 (Apr. 1, 2014), pp. 87-94, XP028659322, ISSN: 0141-3910, DOI: 10.1016/J. Polymdegradstab.2014.03.019, p. 88, point 2.2.
International Search Report and Written Opinion for Application No. PCT/US2017/057381, dated Jan. 17, 2018 (15 pgs).

*Primary Examiner* — Edward J Cain
(74) *Attorney, Agent, or Firm* — Madison C. Makeever (57) ABSTRACT

A polymeric material can be deposited or coated on a surface of a hollow microsphere to produce a sacrificial microsphere. Sacrificial microspheres can provide a cost-effective way to produce lightweight plastics and composites.

17 Claims, 6 Drawing Sheets

SACRIFICIAL MICROSPHERES

CROSS-REFERENCE TO RELATED APPLICATION

This application is national stage filing under 35 U.S.C. § 371 of International Application No. PCT/US2017/057381 filed Oct. 19, 2017, which claims priority under 35 U.S.C. § 119 to U.S. Provisional Application No. 62/409,997 filed Oct. 19, 2016, the disclosures of which are hereby incorporated by reference.

TECHNICAL FIELD

This disclosure relates to compositions and methods for the production and use of sacrificial microspheres.

BACKGROUND

There is a global need to find cost effective ways to produce lightweight polymeric composites. Many strategies, such as foaming or using fillers, have been employed to make such composites. Despite wide-spread use, however, foaming can have several limitations: (1) it can often be difficult to use some melt processing techniques (e.g., injection molding, rotomolding, and thermoforming) with foaming; (2) only certain polymeric resins are amenable to foaming; and (3) it can be difficult produce highly filled polymeric composites with foaming.

Extensive efforts have also focused on producing lightweight polymeric composites by adding fillers into a polymeric matrix. But this approach can face limitations as well: (1) many lightweight fillers do not survive melt processing and can be crushed so that the surrounding polymer matrix in the resulting composition, composite, or article loses its resilience; (2) the cost of ultra high crush strength lightweight fillers can be cost prohibitive in most applications; and (3) some lightweight fillers can be difficult to handle and disperse into a polymeric matrix.

SUMMARY

Sacrificial microspheres can provide a cost-effective way to produce lightweight polymeric composites. A polymeric material can be deposited or coated on a portion of a surface of a hollow microsphere to produce a sacrificial microsphere. Reactions or surface affinity between the hollow microsphere and the polymeric material can be promoted in various ways, including, for example, functionalizing a portion of the hollow microsphere's surface, treating a portion of the hollow microsphere's surface with a liquid monomer and polymerization initiator, condensation polymerization, and crosslinking. Composites made using sacrificial microspheres can have a substantially lower specific gravity than the corresponding virgin polymeric matrix. Under conditions that crush hollow microspheres (e.g., some melt processing conditions or high impact forces), the polymeric coating remains resilient, capable of retaining its original shape or returning to a substantially close shape.

Accordingly, in one embodiment, a sacrificial microsphere includes a hollow microsphere having a resilient polymeric coating on a portion of a surface of the hollow microsphere. In another embodiment, a composition includes a polymeric matrix having a plurality of hollow microspheres dispersed therein, wherein the hollow microspheres have a resilient polymeric coating. In yet another embodiment, an article includes a polymeric composition having sacrificial microspheres dispersed throughout at least a portion of a polymeric composite.

In another embodiment, a method for producing a sacrificial microsphere includes surface treating a plurality of hollow microspheres, applying a polymeric coating onto the plurality of hollow microspheres to form a resilient coating thereon, and optionally post curing or crosslinking the polymeric coating. In yet another embodiment, a method for producing a lightweight article includes providing a plurality of hollow microspheres, coating at least a portion of an outer surface of the plurality of hollow microspheres with a polymeric coating, and curing the polymeric coating on the plurality of hollow microspheres using thermal radiation or actinic radiation.

In another embodiment, a method for melt processing sacrificial hollow microspheres includes providing a plurality of sacrificial hollow microspheres having a resilient polymeric coating to a melt processing device, providing a polymeric material to the melt processing device, and melt processing the plurality of sacrificial hollow microspheres and the polymeric material with the melt processing device to produce a composition, composite, or article. The resilient polymeric coating can enable at least a portion of the sacrificial hollow microspheres to survive melt processing without becoming crushed in the composition, composite, or article.

The above summary is not intended to describe each illustrated embodiment or every implementation of the subject matter hereof. The detailed description that follows more particularly exemplifies various illustrative embodiments.

DETAILED DESCRIPTION

Unless the context indicates otherwise the following terms shall have the following meaning and shall be applicable to the singular and plural:

The terms "a," "an," "the," "at least one," and "one or more" are used interchangeably. Thus, for example, an article containing "a" sacrificial microsphere means that the article may include "one or more" sacrificial microspheres.

The term "coupling agent" means an additive that improves the interfacial adhesion between a polymeric matrix and a filler (e.g., a cellulosic filler).

The term "filler" refers to a material that displays limited viscoelastic properties during melt processing.

The term "highly filled" refers to a polymeric concentrate which after melt processing contains greater than 80 wt % or 50 volume % of filler.

The term "hollow" means having an internal void space.

The term "melt processable composition" means a formulation that is processed using a melt processing technique, typically, at elevated temperatures near or exceeding the melting or softening point of at least one component of the formulation.

The term "melt processing technique" means a technique for applying thermal and mechanical energy to melt process a polymer or composition. Non-limiting examples of such techniques include compounding, extrusion, injection molding, blow molding, rotomolding, or batch mixing. For purposes of this disclosure, melt processing can be differentiated from thermal compression bonding applications.

The term "microsphere" refers to particles having a rounded shape (e.g., spherical, ellipsoidal, ovoid, oblate, or other approximately average spheroidal shape), typically having average diameters between about 1 μm and about 1000 μm.

The terms "polymer" and "polymeric" mean a molecule of high relative molecular mass, the structure of which essentially contains multiple repetitions of units derived, actually or conceptually, from molecules of low relative molecular mass.

The term "polymeric concentrate" means a mixture of a polymeric material and a filler that when melt processed can be formed into a non-friable pellet or agglomerate.

The term "polymeric matrix" refers to a continuous polymeric phase in a polymeric composition, composite, or article.

The terms "preferred" and "preferably" refer to embodiments that may afford certain benefits, under certain circumstances. Other embodiments, however, may also be preferred, under the same or other circumstances. Furthermore, the recitation of one or more preferred embodiments does not imply that other embodiments are not useful, and is not intended to exclude other embodiments from the claimed scope.

The terms "resilience," "resiliency" or "resilient," refer to the ability of a polymeric material applied onto the surface of a hollow microsphere to enable the resulting microsphere to survive melt processing by either preventing or substantially reducing crushing or allowing the hollow microsphere to return to a form substantially close to its original volume or shape.

The term "sacrificial microsphere" means a hollow microsphere upon which a polymeric material has been deposited or coated.

The term "substantially close" means the polymeric coating returns to at least 50%, at least 75% or preferably at least 90% of its original volume or shape.

The recitation of numerical ranges using endpoints includes all numbers subsumed within that range (e.g. 1 to 5 includes 1, 1.5, 3, 3.95, 4.2, 5, etc.).

Figure 1:
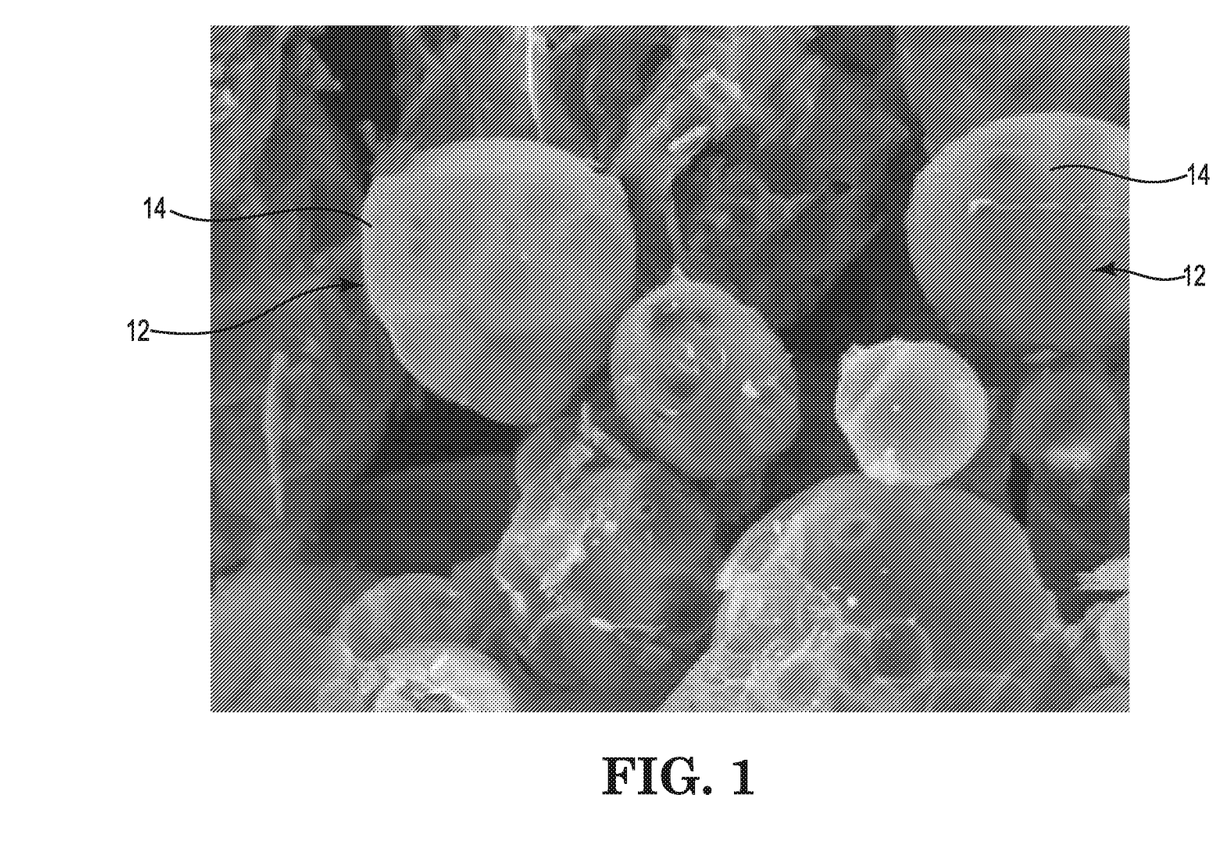
FIG. 1 is a scanning electron microscope image (SEM) at 1000× depicting thermoplastic elastomer (TPE) coated hollow microspheres.

This disclosure relates to compositions and methods for producing and using sacrificial microspheres. FIG. 1 shows a scanning electron microscope (SEM) image at 1000× of sacrificial microsphere 12, which includes a hollow microsphere with thermoplastic elastomer coating 14. A polymeric material, such as that forming thermoplastic elastomer coating 14, can be deposited or coated on a surface of a hollow microsphere to produce a sacrificial microsphere, such as sacrificial microsphere 12. Under conditions that can crush hollow microspheres (e.g., some melt processing conditions or high impact forces), such sacrificial microspheres can remain resilient.

In some embodiments, greater than or equal to about 90% of sacrificial microspheres by weight can survive melt processing by either preventing or substantially reducing crushing or by allowing the microsphere to return to a form substantially close to its original shape. In other embodiments, greater than or equal to about 95% of sacrificial microspheres by weight can survive melt processing by either preventing or substantially reducing crushing or by allowing the microsphere to return to a form substantially close to its original shape. In other embodiments, greater than or equal to about 98% of sacrificial microspheres by weight can survive melt processing by either preventing or substantially reducing crushing or by allowing the microsphere to return to a form substantially close to its original shape.

A variety of hollow microspheres can be used to produce sacrificial microspheres. Such hollow microspheres can be organic or inorganic. Non-limiting examples include glass microspheres, synthetic glass microspheres, ceramic microspheres, expanded perlite, expanded volcanic ash, polymeric microspheres, phenolic microspheres, and cenospheres. Non-limiting examples of hollow microspheres include those sold under the trademark Sil-Cell™ by Silbrico, Inc. In a preferred embodiment, the hollow microsphere has a specific gravity of less than 1.0 $g/cm^3$, which can be measured according to ASTM standard D792.

A variety of polymeric materials can be deposited or coated on all or a portion of a hollow microsphere's surface to produce a sacrificial microsphere. Such polymeric materials can include virgin or recycled thermoplastics, elastomers, and thermosets. Non-limiting examples of such polymers include high density polyethylene (HDPE), low density polyethylene (LDPE), linear low density polyethylene (LLDPE), polypropylene (PP), polyolefin copolymers (e.g., ethylene-butene, ethylene-octene, ethylene-vinyl acetate, ethylene-vinyl alcohol), polystyrene, polystyrene copolymers (e.g., high impact polystyrene, acrylonitrile-styrene, acrylonitrile-butadiene-styrene), polyacrylates, polymethacrylates, polyesters, polyvinylchloride (PVC), fluoropolymers, liquid crystal polymers, polyamides, polyimides, polyether imides, polyphenylene sulfides, polysulfones, polyacetals, polycarbonates, cycloolefin copolymers, silicones, polyphenylene oxides, polyurethanes, thermoplastic elastomers, thermoplastic vulcanates, epoxies, alkyds, melamines, phenolics, vinyl esters or combinations thereof. Such polymeric materials when applied to a sacrificial microsphere can help it survive melt processing and can act absorb energy like a bumper on a car during a collision.

Sacrificial microspheres can be produced in a variety of ways. In one embodiment, at least a portion of a hollow microsphere's surface can be functionalized, or treated with a surface functionalizing reagent or a surface modifying reagent to promote either chemical reaction or surface affinity for the polymeric material.

For example, a variety of surface functionalizing reagents or modifiers can be used to promote reaction or surface affinity between all or a portion of a hollow microsphere's surface and a polymeric coating material. U.S. Pat. Nos. 4,659,889, 4,122,062 and 4,623,738, herein incorporated in their entirety, describe suitable surface modification practices that, when read in view of this disclosure, can be used to produce sacrificial microspheres. Non-limiting examples of surface functionalizing reagents include organo-silanes, organo-titanates and organo-zirconates. In preferred embodiments, surface modifying reagents can include one or more functional organo-silanes, including those that provide amino, acrylic, vinyl, epoxy and isocyanto functionality at the surface.

In another embodiment, hollow microspheres can be treated with a solvent or waterborne solution of a polymeric material and the resulting solvent can be removed or dried. Non-limiting examples of waterborne solution of a polymeric material includes those sold by Dow Chemical under the trademark HYPOD™.

In another embodiment, hollow microspheres can be treated with a liquid monomer and a polymerization initiator. After treatment with such a monomer, the coating can be polymerized using actinic radiation or heat, depending on the choice of initiator. In another embodiment, hollow microspheres can be treated with monomers that can be polymerized using a condensation polymerization (e.g., polyamide, epoxy, phenolic, urethane, polyester, or silicone monomers). In a preferred embodiment, the outer surface of a hollow microsphere can be coated with a polyamide by polymerizing a salt of adipic acid and hexane-1,6-diamine (AH Salt).

In another embodiment, sacrificial microspheres can be produced using crosslinking reactions. Crosslinking can be performed during or after polymerization on the hollow microsphere surface. For example, a multifunctional monomer can be included so that crosslinking occurs during polymerization. Crosslinking after polymerization can occur in a number of ways. For example, functional monomers capable of polymerization and post crosslinking reactions, such as acrylic functionalized alkoxy silanes, can be included in the formulation. Such post crosslinking reactions can, for example, be triggered in various ways. Non-limiting examples of ways to initiate post crosslinking reactions include the following: 1) exposure to moisture, 2) exposure to a cross-reactive chemistry (e.g., epoxy type chemistry), 3) exposure to ultraviolet or electron-beam radiation, and 4) exposure to thermal radiation. Non-limiting examples of free radical initiator/crosslinkers include 32-441 Additive sold by Dow Corning Co. Condensation polymers can also be crosslinked by including multifunctional monomers during polymerization. For example, a tri or multi-functional carboxylic acid or tri or multi-functional amine in the polymerization of AH salt can be employed to create a crosslinked coating on the surface of the microsphere. The crosslinking monomers can typically be added in low levels (e.g., between about 1 and about 20 wt % of the formulation), but can also be included in the formulation at higher levels to tailor the specific properties of the coating.

In preferred embodiments, a sacrificial microsphere can be produced by first modifying at least a portion of a hollow microsphere's surface to produce a reactive surface that is capable of receiving the polymeric material. In some examples, the polymeric material may not bond directly to the surface of the hollow microsphere or, where bonding occurs, may release or hold fragments of the hollow microsphere upon crushing. The surface modified hollow microsphere can subsequently be dispersed in a solvent (e.g., water) and continuously pumped through a polymerization flow cell. The functionalized hollow microsphere can be subsequently treated with a monomer mixture that includes a multifunctional monomer and exposed to heat or radiation (e.g., actinic radiation) to create a polymeric coating on the hollow microsphere's surface. In a preferred embodiment, the hollow microsphere can be completely coated by the polymeric coating.

Sacrificial microspheres can also be directly fused together by exposure to thermal or radiant energy (e.g., actinic radiation). In some embodiments, the sacrificial microsphere's polymeric coating can be a thermoplastic or a thermoset. In some embodiments, a thermoplastic polymeric coating on the microsphere's surface can reflow and fuse the sacrificial microspheres together. In other embodiments, a thermoset polymeric coating can be exposed to actinic radiation so that curing or crosslinking fuses the sacrificial microspheres together. In other embodiments, sacrificial microspheres can include crosslinked thermoplastics, so that they can subsequently be fused together via exposure to actinic or thermal radiation.

Sacrificial microspheres can be incorporated in compositions, composites (e.g., lightweight composites), or articles. In one embodiment, sacrificial microspheres can be melt processed with one or more polymers, such that the polymer(s) forms a polymeric matrix after processing. Sacrificial microspheres can be crushed during melt processing. The polymeric coating on the sacrificial microsphere's surface can maintain its integrity during melt processing, so that the surrounding polymeric matrix remains intact and resilient. After exposure to crushing conditions, the polymeric coating applied to the hollow microspheres can have enough elastomeric character to recover and preserve all or at least a portion of the microsphere's hollowness. Polymeric matrices incorporating sacrificial microspheres can have a lower specific gravity than the virgin polymeric matrix. In an embodiment, the specific gravity is at least 5% less than the virgin polymeric matrix. In another embodiment the specific gravity is at least 10% less than that virgin polymeric matrix. And, in a preferred embodiment, the specific gravity is at least 20% less than that of the virgin polymeric matrix.

A variety of polymers can be used (e.g., as a polymeric matrix) in compositions, composites, or articles incorporating sacrificial microspheres. Such polymers can include virgin or recycled thermoplastics, elastomers, and thermosets. Non-limiting examples of such polymers include high density polyethylene (HDPE), low density polyethylene (LDPE), linear low density polyethylene (LLDPE), polypropylene (PP), polyolefin copolymers (e.g., ethylene-butene, ethylene-octene, ethylene-vinyl acetate, ethylene-vinyl alcohol), polystyrene, polystyrene copolymers (e.g., high impact polystyrene, acrylonitrile-styrene, acrylonitrile-butadiene-styrene), polyacrylates, polymethacrylates, polyesters, polyvinylchloride (PVC), fluoropolymers, liquid crystal polymers, polyamides, polyimides, polyether imides, polyphenylene sulfides, polysulfones, polyacetals, polycarbonates, cycloolefin copolymers, silicones, polyphenylene oxides, polyurethanes, thermoplastic elastomers, thermoplastic vulcanates, epoxies, alkyds, melamines, phenolics, vinyl esters or combinations thereof. In preferred embodiments, the polymeric matrices include polyolefins.

A variety of fillers can be used in the disclosed compositions, composites, or articles or a sacrificial microsphere's polymeric coating. Non-limiting examples of fillers include mineral and organic fillers including carbonates, silicates, talc, mica, wollastonite, clay, silica, alumina, carbon fiber, carbon black, carbon nanotubes, graphite, graphene, volcanic ash, glass fiber, solid glass microspheres, ceramics, and conventional cellulosic materials including wood flour, wood fibers, sawdust, wood shavings, newsprint, paper, flax, hemp, wheat straw, rice hulls, kenaf, jute, sisal, peanut shells, soy hulls, or other cellulose-containing materials that will be familiar, in view of this disclosure, to persons having ordinary skill in the art. In some embodiments, fillers can improve the mechanical or thermal properties of a polymeric material. In other embodiments, fillers can also reduce the coefficient of thermal expansion (CTE) of a polymeric article.

A variety of additives can be employed in compositions, composites, or articles incorporating sacrificial microspheres or a sacrificial microsphere's polymeric coating. Non-limiting examples of suitable additives include antioxidants, light stabilizers, fibers, blowing agents, foaming additives, antiblocking agents, heat stabilizers, impact modifiers, biocides, antimicrobial additives, compatibilizers, plasticizers, tackifiers, processing aids, lubricants, coupling agents, flame retardants and colorants. The additives may be incorporated into the melt processable composition in the form of powders, pellets, granules, or in any other extrudable form. The amount and type of conventional additives in the melt processable composition may vary depending upon the polymeric matrix, the sacrificial microspheres, and the desired physical properties of the finished composition.

In a preferred embodiment, an additive can include a coupling agent or antioxidant. Non-limiting examples of coupling agents include organo-silanes, organo-zirconates, organo-titanates and functionalized polymers. Preferred coupling agents included organo-silane and maleic anhydride grafted polymers. Non-limiting examples of maleic anhydride grafted polymers include those sold under the trademarks Polybond™ (Addivant), Extinity™ (NWP), Integrate™ (Lyondell Basell), and Fusabond™ (DuPont). Typical loading levels of coupling agents or antioxidants can be around 0.1 to 5 wt % of the lightweight composite formulation.

In some embodiments, using a filler or additive in sacrificial microsphere's polymeric coating can improve the performance of the filler or additive. For example, the electrical or thermal conductivity efficiency can be increased by including conductive carbon or nanotubes in such polymeric coatings. Without intending to be bound by theory, this may be because the conductive surface of the hollow microsphere can reach percolation thresholds more efficiently than the conductive carbon or carbon nanotubes alone. As such, the sacrificial microsphere can fill free volume allowing much lower overall loadings of expensive additives.

Melt-processing of the sacrificial microsphere and a polymer can be performed at a variety of temperatures (e.g., from 80° to 300° C.) with optimum operating temperatures typically being selected depending upon the melting point, melt viscosity, and thermal stability of the composition. Different types of melt processing equipment, such as extruders, may be used for melt processing.

Sacrificial microspheres have broad utility in the automotive, building and construction, and consumer and appliance industries. Non-limiting uses include automotive components and appliance housings.

Sacrificial microspheres also have utility in providing end-use articles designed to reduce direct or glancing impact forces. Such end-use articles can allow for the dissipation of force on contact without permanent deformation. Non-limiting examples of these end-uses include, but are not limited to, helmets (e.g., motorcycle and bike helmets, football helmets, construction helmets, etc.), protective layers (e.g., shin guards, etc.), and other barriers (e.g., fencing, railing, roofing, siding, containers, etc.).

The disclosed sacrificial microspheres, and the advantages thereof, are further described in the following non-limiting Examples. In the following Examples, all parts and percentages are by weight unless otherwise indicated.

EXAMPLES

TABLE 1

| Material | Description |
|---|---|
| TPU | ELASTOLLAN ™ Soft 35A12P from BASF, Ludwigshafen, Germany. |
| Surfactant | EFKA ™ PU 4063 surfactant from BASF Corp., Charlotte, NC, USA |
| TPE | KRATON ™ MD6951 MS from Kraton Performance Polymers, Inc, Houston, TX, |
| Polyolefin Elastomer | ENGAGE ™ 8440, commercially available from Dow Chemical Co., Midland, MI |
| Polyolefin Dispersion | HYPOD ™ 1001, commercially available from Dow Chemical Co., Midland, MI |
| Initiator | Benzophenone, commercially available from Aldrich Chemical, Inc. Milwaukee, WI |
| MMA | Methyl methacrylate, commercially available from Aldrich Chemical, Inc. Milwaukee, WI |
| EGDMA | Ethylene glycol dimethacrylate, commercially available from Aldrich Chemical, Inc. Milwaukee, WI |
| Silane 1 | Octyltriethoxysilane, commercially available from Aldrich Chemical, Inc. Milwaukee, WI |
| Silane 2 | Acryloxytriethoxysilane, commercially available from Aldrich Chemical, Inc. Milwaukee, WI |
| Hollow Microsphere(s) | SIL-CELL ™, grade 32 from Silbrico Corp, Hodgkins, IL, USA. |
| Nylon Salt | Nylon 6,6 salt from Ascend Performance Materials, Houston, TX, USA. |
| Carbon Black | ENSACO ™ 350G carbon black from Imerys Graphite & Carbon USA Inc., Westlake, OH, USA. |
| 1,6-DAH | 1,6-diaminohexane from TCI America, Portland, OR, USA. |
| 1,2,3 PTA | 1,2,3-propetricarboxylic acid from TCI America, Portland, OR, USA. |

Example 1

Sacrificial Microspheres Having a Polyolefin Coating

Sacrificial microspheres were prepared by coating Hollow Microspheres with a polyolefin. Hollow Microspheres were treated with Silane 1 and then coated with Polyolefin Dispersion. The coated Hollow Microspheres were then exposed to Dow Corning™ 32-441 additive and post cured at 100° C. for 24 hours in a pressure cooker to produce sacrificial microspheres.

Example 2

Sacrificial Microspheres Having an Acrylic Thermoset Coating

Sacrificial microspheres were prepared by coating Hollow Microspheres with an acrylic thermoset polymer. Hollow Microspheres were treated with Silane 1 and then coated with a 10:1 mixture of MMA and EGDMA containing 1% Initiator. The coated Hollow Microspheres were then exposed to high intensity ultraviolet light (UV LED with 365 nm peak wavelength) to produce sacrificial microspheres.

Example 3

Sacrificial Microspheres Having a Thermoplastic Polyurethane Coating

Sacrificial microspheres were prepared by coating Hollow Microspheres with a thermoplastic urethane. 400 g of a 10 wt % solution of TPU in tetrahydrofuran and 2 g (5 wt % to TPU) of Surfactant were added to a first 1-quart clear glass jar. The resulting solution was swirled to dissolve Surfactant. 60 g of Hollow Microspheres with average diameters between 53-106 µm were then added to the solution. The jar was then capped and placed on a roller mill for at least 10 minutes to mix the materials. 140 g of this mixture, 150 mL of ethyl acetate, and 100 mL of ethanol were added to a second 1-quart clear glass jar. 150 mL of ethanol was then added dropwise over a period of at least five minutes. The resulting sacrificial microsphere mixture was poured into a compressed air paint sprayer and spray dried into a spray booth. The sacrificial microspheres were collected after allowing residual solvent to evaporate for about fifteen minutes.

Examples 4-5

Sacrificial Microspheres Having a Thermoplastic Elastomer Coating

Sacrificial microspheres were prepared by coating Hollow Microspheres with a thermoplastic elastomer coating, an example of which is shown in FIG. 1. In Example 4, approximately 100 mL of a 15 wt % solution of 1:1 TPE to Hollow Microspheres in toluene and about 100 mL of distilled water were added to an 8-oz clear glass jar. The mixture was vigorously shaken to encourage mixing and resulted in a loose dispersion of TPE coated microspheres. The mixture was then poured into a 1-quart air powered paint sprayer with about 400 mL of distilled water. The resulting mixture was sprayed onto a polyethylene sheet. The sacrificial microspheres were collected after drying.

Figure 2A:
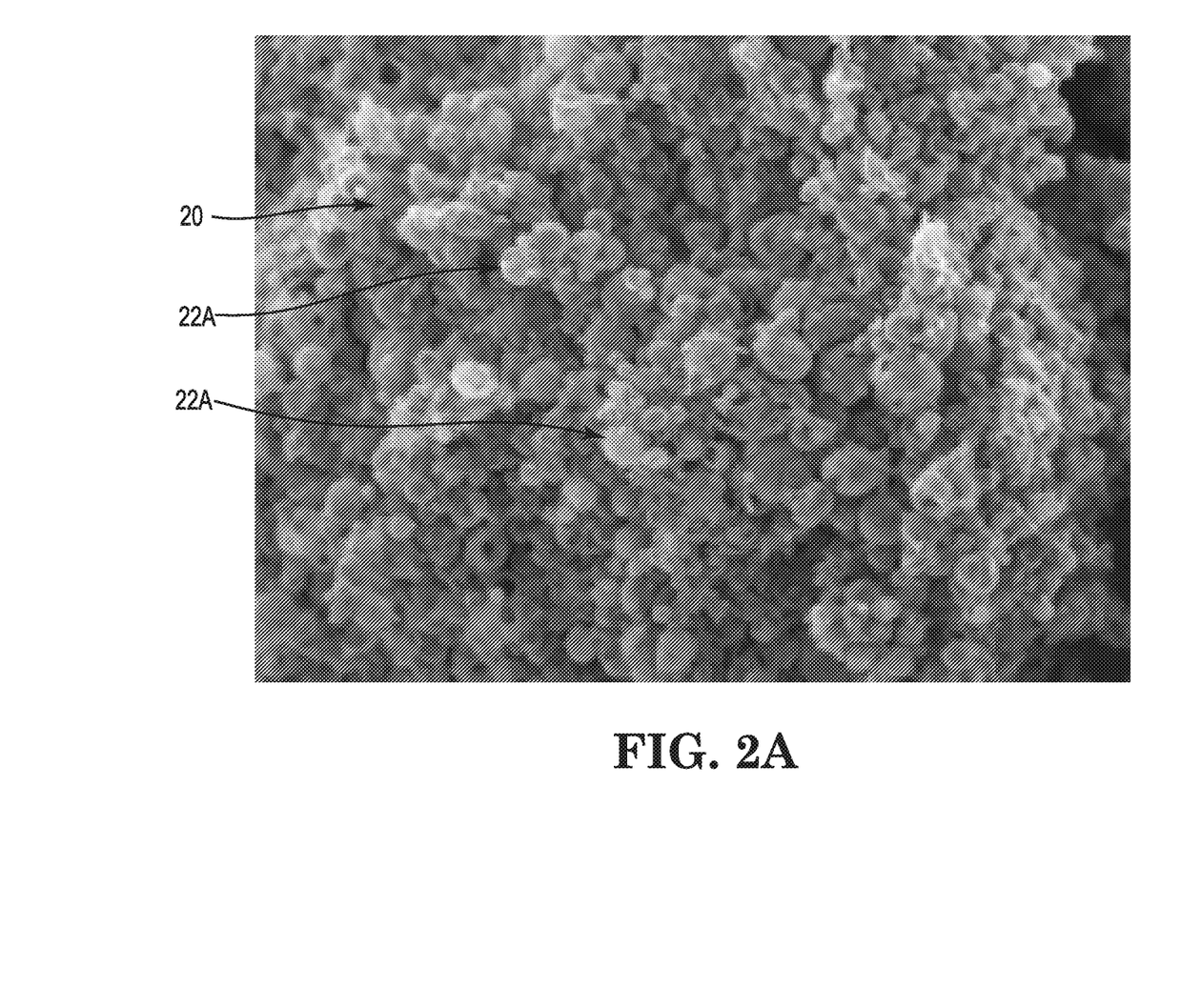
FIG. 2A is an SEM image at 100× depicting cast sacrificial microspheres before compression.
Figure 2B:
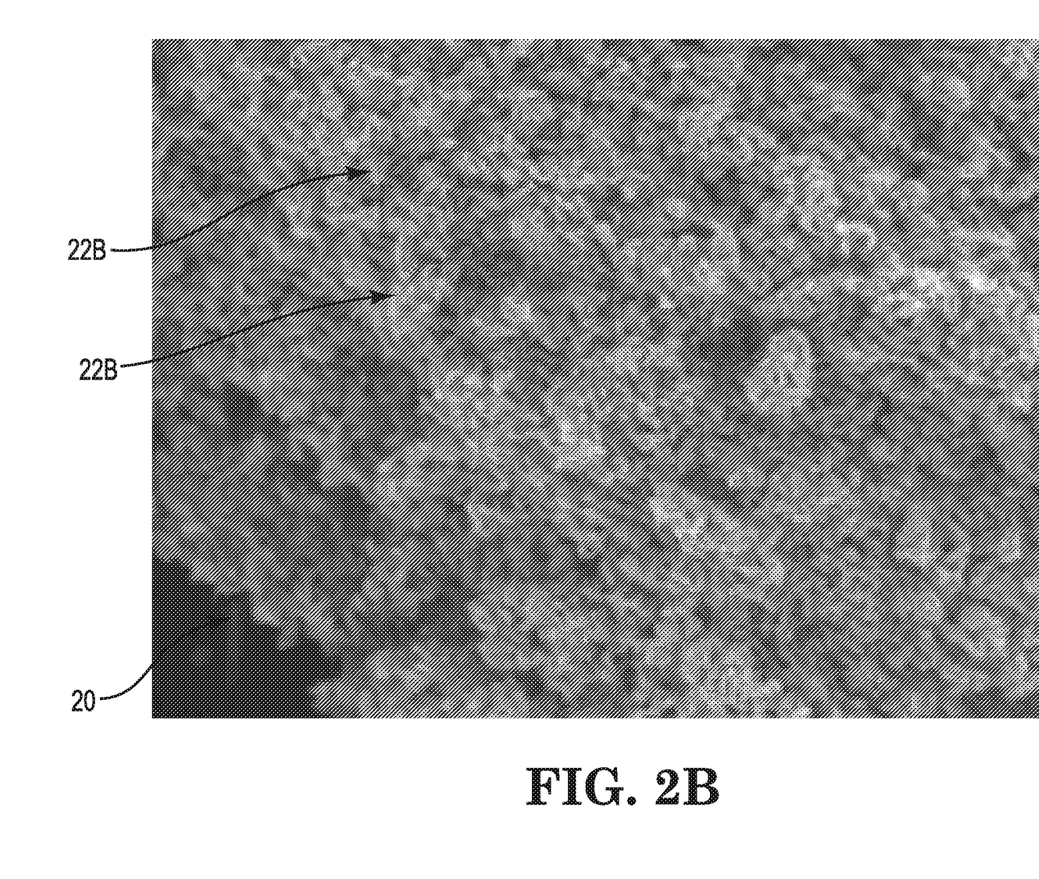
FIG. 2B is an SEM image at 100× depicting sacrificial microspheres after compression.

Example 5 was prepared in a similar manner to Example 4. Instead of spray drying the TPE coated hollow microspheres, however, the mixture was poured into a glass tray to evaporate the solvent. The evaporation resulted in an approximately 4 mm thick sponge-like material. Cross-sections of the sponge-like material were analyzed by SEM before and after compression, as shown in FIGS. 2A-2B FIG. 2A shows an SEM image of cast TPE coated hollow microspheres 22A in sponge-like material 20. A portion of the sponge-like material was then placed in a compression molder between 2 sheets of Kapton™ film and compressed at approximately 10,000 psi (approximately 68,900 kPA). When the compression was released, the sponge-like material partially recovered. FIG. 2B shows an SEM image of compressed TPE coated hollow microspheres 22B in sponge-like material 20. Table 2 includes the specific gravity and durometer values of the TPE base resin, cast sacrificial microsphere sponge, and compressed sacrificial microsphere sponge.

TABLE 2

CHARACTERIZATION OF TPE COATED HOLLOW MICROSPHERES

| Sample | Specific Gravity (g/cm$^3$) | Durometer (Shore A) |
| --- | --- | --- |
| TPE | 0.89 | 45 |
| Example 5 | 0.27 | 50 |
| Example 5 after Compression | 0.62 | 25 |

Examples 6-7 and Comparative Example 1

Sacrificial Microspheres Having a Nylon Coating and Composites Made Therewith

In Example 6, sacrificial microspheres were prepared by coating hollow microspheres with nylon. 15 g of Nylon Salt and 15 g of hollow microspheres (Sil-Cell™ 42bc microcellular filler (75-106 µm diameter)) were added to a 500 mL round bottom flask fitted with a coiled spring agitator. The flask was placed on a rotary evaporator (model 8200 from Büchi) and rotated at about 60 RPM. A vacuum applied at less than 10 torr (approximately 1333 Pa). The flask and its contents were heated to 205-210° C., and the mixture began to resemble wet sand. The mixture was maintained at this temperature for 30 minutes. The mixture was then cooled to room temperature before releasing the vacuum. A sample of the material was removed and analyzed by DSC/TGA in nitrogen from 30° C. to 230° C. at a rate of 10° C./min (model STA 449 F3, Netzsch Group, Selb, Germany) to reveal no mass loss or additional polymerization.

Figure 3:
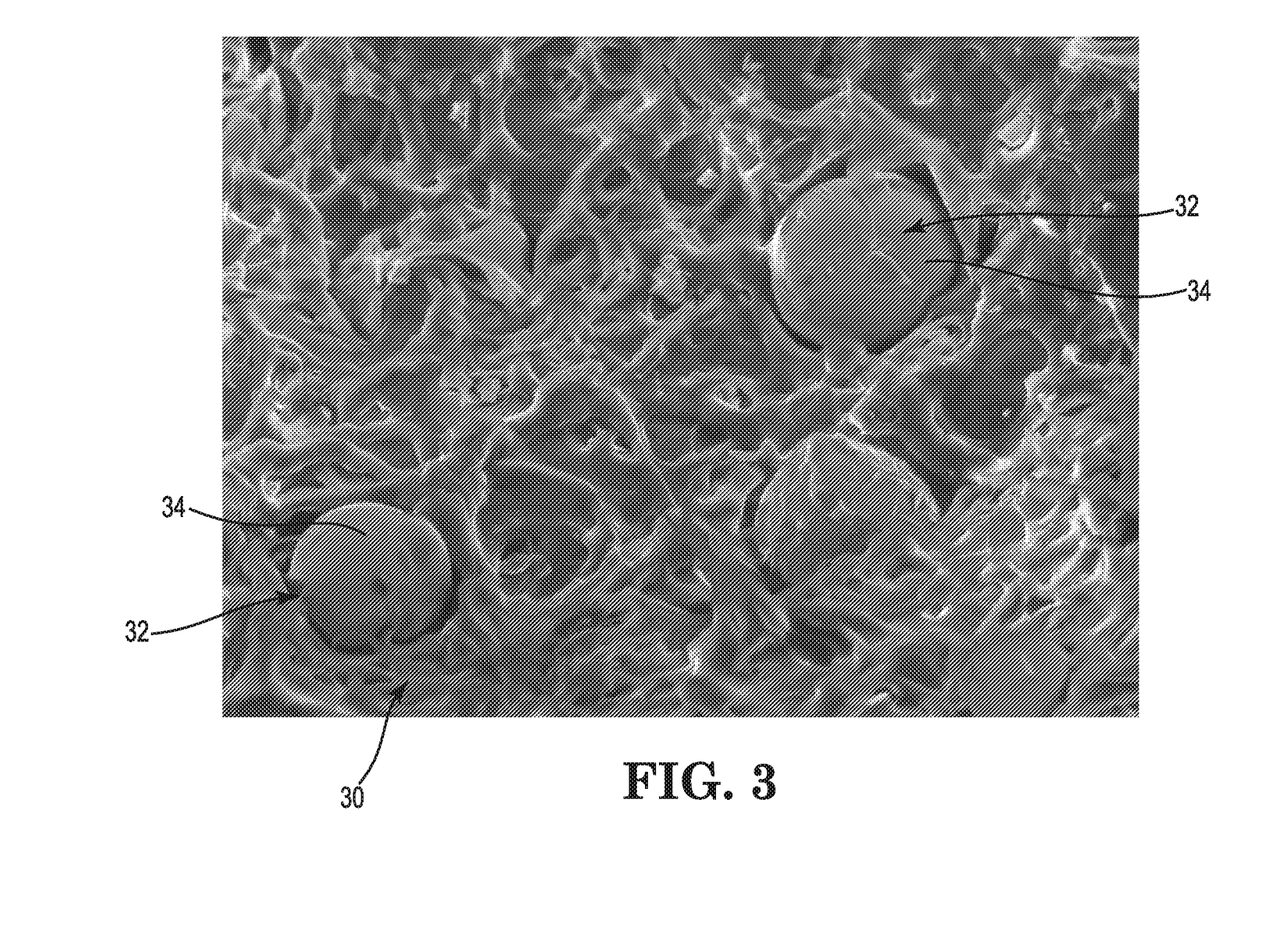
FIG. 3 is an SEM image at 800× depicting nylon 6, 6-coated hollow microspheres in a polyolefin elastomer matrix.

In Example 7, the sacrificial microspheres of Example 6 were processed with an olefin elastomer. A 90:10 mixture of Polyolefin Elastomer to the nylon coated sacrificial microspheres were dry blended in a plastic bag and gravimetrically fed into a 11 mm twin screw extruder (Process 11, commercially available from Thermo Scientific, 40:1 L:D). Compounding was performed at a 205° C. temperature profile for zones 1-8 with the die temperature of 200° C. at 150 rpm screw speed and 14 g/min output. The specific gravity of the resulting strands was assessed using the Archimedes Method, as shown in Table 3. A portion of the extruded filament was also cooled in liquid nitrogen, fractured to reveal the internal surface cross-section, and analyzed under SEM, as shown in FIG. 3. FIG. 3 is an SEM image at 800× depicting sacrificial microspheres 32, having nylon 6, 6 coating 34, in polyolefin elastomer matrix 30.

In Comparative Example 1 (CE1), uncoated hollow microspheres at 10 wt % were processed with an olefin elastomer, using the same steps as Example 7. The specific gravity of these strands was also assessed according to ASTM standard D792, as shown in Table 3. As Table 3 shows, the sacrificial microsphere composite of Example 7 exhibited lower specific gravity than the base resin and Comparative Example 1.

TABLE 3

SPECIFIC GRAVITY COMPARISON

| Sample | Specific Gravity (g/cm$^3$) |
| --- | --- |
| Polyolefin Elastomer | 0.89 |
| CE1 | 0.92 |
| 7 | 0.78 |

Examples 10-14 and Preparatory (1) and Comparative Examples (2-4)

Synthesis of a Trifunctional Nylon Salt Cross-Linker

In Preparatory Example 1, a trifunctional nylon salt cross-linker was prepared. 5.17 g (29.3 mmol) of 1,2,3-Propanetricarboxylic acid in 75 mL of dry tetrahydrofuran was added to a 250 mL single-neck, round bottom flask. 5.139 g (44.2 mmol) 1,6-diaminohexane in 75 mL of dry tetrahydrofuran was then added dropwise to the flask for about an hour with vigorous stirring. The flask was then placed on a rotary evaporator to remove the tetrahydrofuran. The resulting nylon salt was scraped from the flask and dried in a hot air oven at 75° C. to yield 10.1 g of the trifunctional nylon salt cross-linker.

Conductive Sacrificial Microspheres

Figure 4:
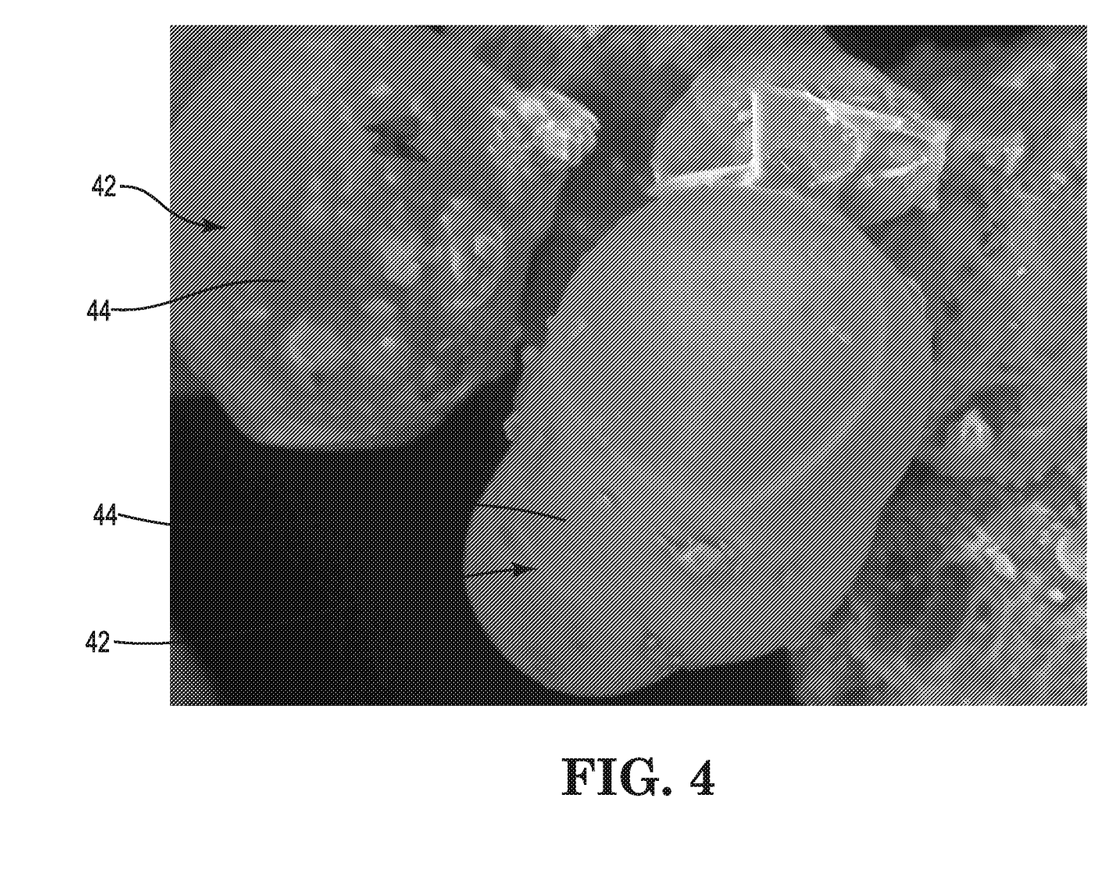
FIG. 4 is an SEM image at 1000× depicting hollow microspheres coated with carbon black loaded nylon.

In Example 8, conductive sacrificial microspheres were produced using the trifuctional salt cross-linker of Preparatory Example 1. A blended mixture of 14.25 g of Nylon Salt, 0.75 g of trifunctional nylon salt cross-linker, and 1.13 g of Carbon Black were added to a 500 mL round bottom flask fitted with a coiled spring agitator. 15 g of Sil-Cell (42*bc* microcellular filler (75-106 μm diameter)) was then added to the flask. The flask was placed on a rotary evaporator and rotated at about 60 RPM. A vacuum applied at less than 10 torr. The flask and its contents were heated to 205-210° C., and the mixture began to resemble wet sand. The mixture was maintained at this temperature for 30 minutes. The mixture was then cooled to room temperature before releasing the vacuum. A sample of the material was removed and analyzed by DSC/TGA in nitrogen from 30° C. to 230° C. at a rate of 10° C./min (model STA 449 F3, Netzsch Group, Selb, Germany.) to reveal no mass loss or additional polymerization. An SEM analysis was also performed. FIG. 4 shows an SEM image at 1000× depicting conductive microspheres 42 having carbon black loaded nylon coating 44. Example 9 was prepared in a similar manner to Example 8 with the exception that 0.375 g of carbon nanotubes were used in the coating instead of Carbon Black.

Conductive Sacrificial Microsphere Composites

Referring now to Examples 10-14 and Comparative Examples 2-4, composites were produced according to the formulations set forth in Table 4 and subjected to resistivity testing. For Examples 10-12, composites including the conductive sacrificial microspheres of Example 8 were produced. For Examples 13-14, composites including the conductive sacrificial microspheres of Example 9 were produced. Comparative Example 2 included only Polyolefin Elastomer, while Comparative Examples 3-4 incorporated Carbon Black in Polyolefin Elastomer.

TABLE 4

EXAMPLE FORMULATIONS

| Example | Polyolefin Elastomer | Carbon Black | Conductive Sacrificial Microspheres (Example 8) | Conductive Sacrificial Microspheres (Example 9) |
|---|---|---|---|---|
| CE2 | 100 | | | |
| CE3 | 98 | 2 | | |
| CE4 | 96.5 | 3.5 | | |
| 10 | | | 5 | |
| 11 | | | 10 | |
| 12 | | | 12 | |
| 13 | | | | 10 |
| 14 | | | | 20 |

Figure 5:
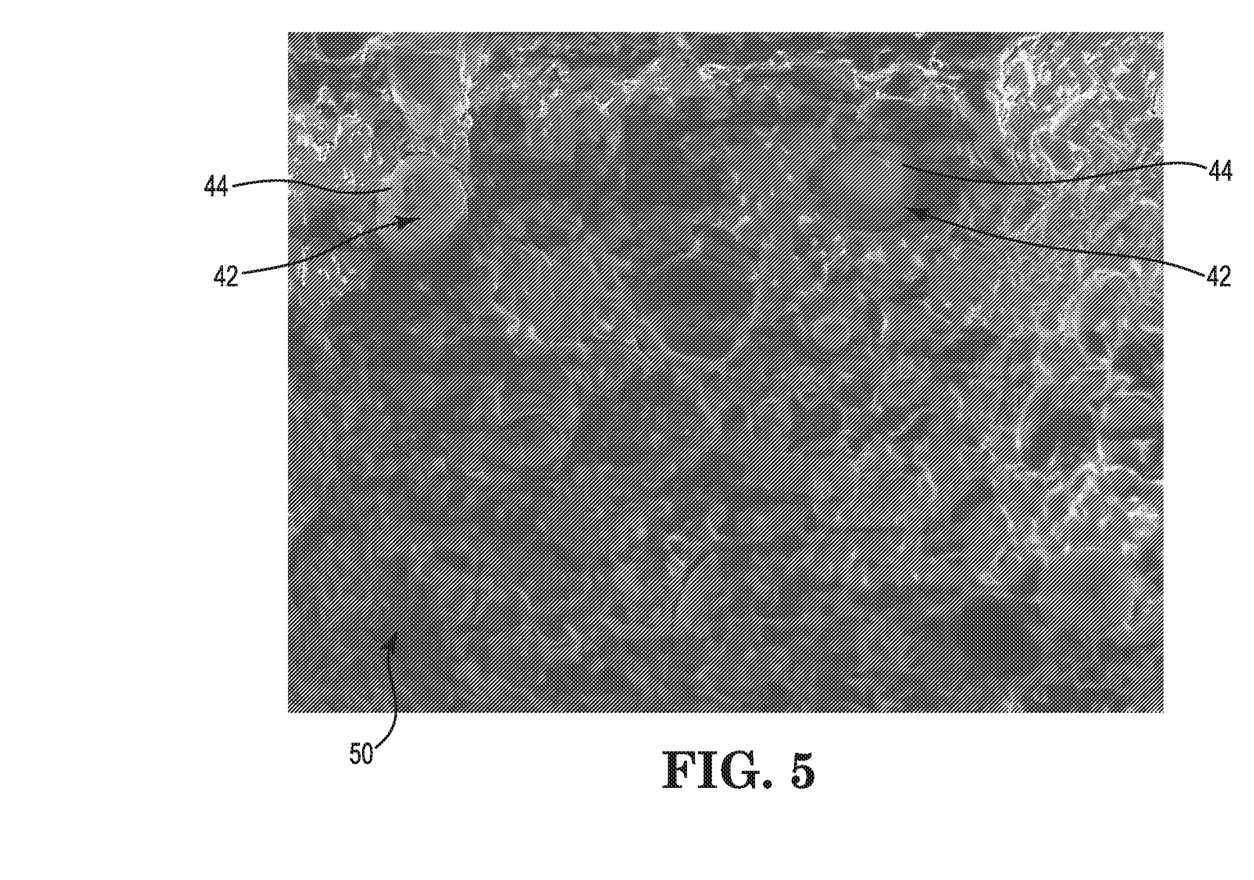
FIG. 5 is an SEM image at 500× depicting conductive sacrificial microspheres in a polyolefin elastomer matrix.

For Examples 10-14 and Comparative Examples 3-4, the conductive sacrificial microspheres or carbon black were dry blended in a plastic bag with Polyolefin Elastomer. Examples 10-14 and Comparative Examples 2-4 were gravimetrically fed into an 11 mm twin screw extruder (Process 11, commercially available from Thermo Scientific, 40:1 L:D). Compounding was performed at a 205° C. temperature profile for zones 1-8 with the die temperature of 200° C. at 150 rpm screw speed and 14 g/min output. A portion of the extruded filament was analyzed under SEM, as shown in FIG. 5. FIG. 5 is an SEM image at 500× depicting conductive sacrificial microspheres 42 in a polyolefin matrix 50.

Another portion of the extruded filament of Examples 10-14 and Comparative Example 2-4 were each respectively pelletized and then pressed into a plaque using a hot platen press. The samples were pressed at 150° C. for minutes at about 200 psi (about 1378 kPa) between KAPTON™ polyimide films (available commercially from DuPont). The resulting material was testing for surface and volume resistivity according to ASTM standard D257-07. The resistivity results are given in Table 5 below.

TABLE 5

RESITIVITY MEASUREMENTS

| Example | Surface Resistivity ($10^{12}$ ohms-square) | Volume Resistivity ($10^{13}$ ohms-cm) | Effective Carbon Loading % |
|---|---|---|---|
| CE2 | >2 | 5.20 | 0 |
| CE3 | >2 | 2.40 | 2.5 |
| CE4 | >2 | 0.20 | 3.5 |
| 10 | >2 | 0.27 | 0.18 |
| 11 | >2 | 0.25 | 0.36 |
| 12 | >2 | 0.15 | 0.43 |
| 13 | >2 | 0.13 | 0.125 |
| 14 | >2 | 0.09 | 0.25 |

Although specific embodiments have been illustrated and described herein for purposes of description of the preferred embodiments, it will be appreciated by those of ordinary skill in the art that a wide variety of alternate or equivalent embodiments calculated to achieve the same purposes may substituted for the specific embodiments shown and described without departing from the scope of the disclosure. This application is intended to cover any such adaptions or variations of the disclosed embodiments.

What is claimed is:

1. A sacrificial microsphere comprising:
an inorganic hollow microsphere having an outer surface; and
a resilient polymeric coating on at least a portion of the outer surface of the inorganic hollow microsphere;
wherein the resilient polymeric coating enables at least a portion of the inorganic hollow microsphere to survive melt processing by either preventing or reducing crushing or allowing the inorganic hollow microsphere to return to at least 50% of its original volume or shape.

2. The sacrificial microsphere of claim 1, wherein the resilient polymeric coating is a thermoplastic polymer.

3. The sacrificial microsphere of claim 1, wherein the resilient polymeric coating is a crosslinked thermoplastic polymer.

4. The sacrificial microsphere of claim 1, wherein the resilient polymeric coating is elastomeric.

5. The sacrificial microsphere of claim 1, wherein the resilient polymeric coating is a thermoset polymer.

6. The sacrificial microsphere of claim 1, wherein the resilient polymeric coating includes filler.

7. The sacrificial microsphere of claim 6, wherein the filler includes a thermally conductive filler.

8. The sacrificial microsphere of claim 6, wherein the filler includes a conductive filler.

9. A method for producing a lightweight article comprising:
a) providing an inorganic hollow microsphere having an outer surface;
b) coating at least a portion of the outer surface of the inorganic hollow microsphere with a polymerizable or polymeric coating; and c) solidifying or curing the polymerizable or polymeric coating on the outer surface to form a resilient polymeric coating;

wherein the resilient polymeric coating enables at least a portion of the inorganic hollow microsphere to survive melt processing by either preventing or reducing crushing or allowing the inorganic hollow microsphere to return to at least 50% of its original volume or shape.

10. The method according to claim 9, wherein solidifying or curing the polymerizable or polymeric coating on the outer surface to form the resilient polymeric coating includes thermal radiation or actinic radiation.

11. A method for producing a sacrificial microsphere comprising:

d) surface treating an inorganic hollow microsphere having an outer surface;

e) applying a polymeric coating onto the inorganic hollow microsphere to form a resilient coating on the inorganic hollow microspheres; and f) optionally post curing or crosslinking the polymeric coating;

wherein the resilient coating enables at least a portion of the inorganic hollow microsphere to survive melt processing by either preventing or reducing crushing or allowing the inorganic hollow microsphere to return to at least 50% of its original volume or shape.

12. A composition comprising:

a polymeric matrix having a plurality of inorganic hollow microspheres dispersed in the polymeric matrix, wherein the plurality of inorganic hollow microspheres have a resilient polymeric coating;

wherein the polymeric matrix comprises one or more polymers which are independent of the resilient polymeric coating; and wherein the resilient polymeric coating enables at least a portion of the inorganic hollow microspheres to survive melt processing by either preventing or reducing crushing or allowing the inorganic hollow microspheres to return to at least 50% of its original volume or shape.

13. An article comprising a polymeric composite having the sacrificial microspheres of claim 1 dispersed throughout at least a portion of the polymeric composite.

14. A method for melt processing sacrificial inorganic hollow microspheres comprising:

providing a plurality of sacrificial inorganic hollow microspheres having a resilient polymeric coating to a melt processing device;

providing a polymeric material to the melt processing device; and melt processing the plurality of sacrificial inorganic hollow microspheres and the polymeric material with the melt processing device to produce a composition;

wherein the resilient polymeric coating enables at least a portion of the sacrificial inorganic hollow microspheres to survive melt processing by either preventing or reducing crushing or allowing the sacrificial inorganic hollow microspheres to return to at least 50% of its original volume or shape.

15. The method according to claim 14, wherein the resilient polymeric coating enables at least 90 percent by weight of the plurality of sacrificial inorganic hollow microspheres to survive melt processing without becoming crushed in the composition.

16. The method according to claim 14, wherein the resilient polymeric coating enables at least 95 percent by weight of the plurality of sacrificial inorganic hollow microspheres to survive melt processing without becoming crushed in the composition.

17. The method according to claim 14, wherein the resilient polymeric coating enables at least 98 percent by weight of the plurality of sacrificial inorganic hollow microspheres to survive melt processing without becoming crushed in the composition.

\* \* \* \* \*